US012393904B2

(12) United States Patent
Heinla et al.

(10) Patent No.: US 12,393,904 B2
(45) Date of Patent: *Aug. 19, 2025

(54) METHOD AND SYSTEM FOR AUTONOMOUS OR SEMI-AUTONOMOUS DELIVERY

(71) Applicant: STARSHIP TECHNOLOGIES OÜ, Tallinn (EE)

(72) Inventors: Ahti Heinla, Tallinn (EE); Allan Martinson, Tallinn (EE); Kalle-Rasmus Volkov, Tallinn (EE); Andrew Macks, Ääamäe (EE); Lindsay Roberts, Tallinn (EE); Indrek Mandre, Tallinn (EE); Märt Liivik, Lääne-Virumaa (EE); Tiit Liivik, Tallinn (EE); Ivo Liivik, Harju maakond (EE)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 591 days.

This patent is subject to a terminal disclaimer.

(21) Appl. No.: 17/493,959

(22) Filed: Oct. 5, 2021

(65) Prior Publication Data

US 2022/0028023 A1  Jan. 27, 2022

Related U.S. Application Data

(63) Continuation of application No. 15/948,974, filed on Apr. 9, 2018, now Pat. No. 11,164,273, which is a (Continued)

(30) Foreign Application Priority Data

Oct. 13, 2015 (EP) .................................. 15189661
Nov. 2, 2015 (EP) .................................. 15192648
Nov. 2, 2015 (EP) .................................. 15192649

(51) Int. Cl.
G06Q 50/28 (2012.01)
G05B 19/418 (2006.01)
(Continued)

(52) U.S. Cl.
CPC ....... *G06Q 10/08* (2013.01); *G05B 19/41895* (2013.01); *G05D 1/0027* (2013.01);
(Continued)

(58) Field of Classification Search
CPC ............... G06Q 10/08; G06Q 10/0832; G05B 19/41895; G05D 1/0027; G05D 1/0061; G05D 1/0282; Y02P 90/02; Y02P 90/60
See application file for complete search history.

(56) References Cited

U.S. PATENT DOCUMENTS 7,894,939 B2  2/2011  Zini et al.
8,948,914 B2  2/2015  Zini et al.
(Continued)

FOREIGN PATENT DOCUMENTS

CN  103587868 A  2/2014
CN  104555222 A  4/2015
(Continued)

OTHER PUBLICATIONS

JPO, First Office Action (non-final Notice of Reasons for Rejection) dated Oct. 18, 2022 (mailed Oct. 25, 2022), for Japanese Patent Application No. 2021-125247, pp. 1-8.
(Continued)

Primary Examiner — Nga X Nguyen
(74) Attorney, Agent, or Firm — Siritzky Law, PLLC

(57) ABSTRACT

A delivery method includes providing a system with at least one server, at least one robot, and at least one delivery terminal. The method includes communicating a request for at least one delivery from the at least one delivery terminal to the at least one server and/or to the at least one robot;
(Continued)

providing instructions from the at least one server to the at least one robot about the at least one delivery, the instructions comprising information about a final delivery location; loading the at least one robot with the at least one delivery to be transported; transporting the at least one delivery in the at least one robot to the final delivery location; and providing access to the at least one delivery in the at least one robot, preferably upon arrival at the delivery location. A system has at least one server adapted for at least: coordinating communication within the system, receiving/storing/sending data and/or performing computations; at least one robot operating autonomously or semi-autonomously and adapted to communicate with the at least one server in order to facilitate transport of a delivery by the robot to at least one recipient; and at least one delivery terminal communicating with the at least one robot and/or the at least one server.

21 Claims, 6 Drawing Sheets

Related U.S. Application Data continuation of application No. PCT/EP2016/074620, filed on Oct. 13, 2016.

(51) Int. Cl.
  *G05D 1/00* (2024.01)
  *G06Q 10/08* (2024.01)
  *G06Q 10/0832* (2023.01)

(52) U.S. Cl.
  CPC ....... *G05D 1/0061* (2013.01); *G06Q 10/0832* (2013.01); *Y02P 90/02* (2015.11); *Y02P 90/60* (2015.11)

(56) References Cited

U.S. PATENT DOCUMENTS

| | | | |
|---|---|---|---|
| 9,031,692 | B2 | 5/2015 | Zhu |
| 9,244,147 | B1 | 1/2016 | Soundararajan et al. |
| 9,256,852 | B1 | 2/2016 | Myllymaki |
| 9,373,149 | B2 | 6/2016 | Abhyanker |
| 9,557,740 | B2 | 1/2017 | Crawley |
| 9,561,941 | B1 | 2/2017 | Watts |
| 9,682,481 | B2 | 6/2017 | Lutz et al. |
| 9,694,976 | B1 | 7/2017 | Wurman et al. |
| 9,844,879 | B1 | 12/2017 | Cousins et al. |
| 11,164,273 | B2 * | 11/2021 | Heinla .................. G06Q 10/08 |
| 2003/0165373 | A1 | 9/2003 | Felder et al. |
| 2006/0237239 | A1 | 10/2006 | Bruner et al. |
| 2009/0323046 | A1 | 12/2009 | Tan et al. |
| 2012/0090110 | A1 | 4/2012 | Van Den Berg et al. |
| 2013/0110281 | A1 | 5/2013 | Jones et al. |
| 2013/0332021 | A1 | 12/2013 | Goren |
| 2014/0081445 | A1 | 3/2014 | Villamar |
| 2014/0136414 | A1 | 5/2014 | Abhyanker |
| 2014/0254896 | A1 | 9/2014 | Zhou et al. |
| 2014/0355446 | A1 | 12/2014 | Altman |
| 2014/0365258 | A1 | 12/2014 | Vestal et al. |
| 2015/0006005 | A1 * | 1/2015 | Yu .......................... G06Q 10/08 701/22 |
| 2015/0045945 | A1 | 2/2015 | Zini et al. |
| 2015/0100152 | A1 | 4/2015 | Trevino et al. |
| 2015/0183581 | A1 | 7/2015 | Worsley |
| 2015/0379468 | A1 | 12/2015 | Harvey |
| 2016/0368464 | A1 | 12/2016 | Hassounah |
| 2016/0373908 | A1 | 12/2016 | Iwai et al. |
| 2017/0017237 | A1 | 1/2017 | Tokuyama et al. |
| 2017/0100837 | A1 | 4/2017 | Zevenbergen et al. |
| 2017/0220981 | A1 | 8/2017 | Shucker et al. |
| 2017/0364074 | A1 | 12/2017 | Lau et al. |
| 2017/0368684 | A1 | 12/2017 | Zevenbergen et al. |
| 2018/0005169 | A1 | 1/2018 | High et al. |
| 2018/0020896 | A1 | 1/2018 | High et al. |
| 2018/0024554 | A1 | 1/2018 | Brady et al. |

FOREIGN PATENT DOCUMENTS

| | | |
|---|---|---|
| JP | 2004243499 A | 9/2004 |
| JP | 2005209090 A | 8/2005 |
| JP | 2012053659 A | 3/2012 |
| JP | 2019502975 A | 1/2019 |
| WO | 2011035839 A2 | 3/2011 |
| WO | 2015001795 A1 | 1/2015 |
| WO | 2015151266 A1 | 10/2015 |
| WO | 2017156586 A1 | 9/2017 |

OTHER PUBLICATIONS

KIPO, Office Action (Notice of Comment) dated mailed Feb. 1, 2024, for Korean Patent Application No. 10-2018-7013510, pp. 1-33.
English Abstract of CN 103587868.
English Abstract of CN 104555222.
EPO / WIPO, International Search Report dated Apr. 20, 2017 in International Application No. PCT/EP2016/074620 [3 pages].
EPO / WIPO, Written Opinion of the International Search Authority dated Apr. 20, 2017 in International Application No. PCT/EP2016/074620 [5 pages].
Japanese Patent Office (JPO) Office action for Patent Application No. 2018-519791, dated Mar. 24, 2020 [Japanese with English language machine translation].
JPO, Decision of Final Rejection, Japanese Application No. 2018-519791 (dated Mar. 30, 2021).
Kazumichi Inoue, "Proposal and Considerations of Mobile Robot Design Policy in Tsukuba Challenge", Journal of the Robotics Society of Japan, Robotics Society of Japan, Apr. 15, 2012, vol. 30, No. 3, pp. 2-12.
SIPO, PRC, First Office Action for Application No. CN 201680057291 (CN 108139754 A), dated Sep. 2, 2020 (in Chinese with English translation from Global Dossier).
SIPO, PRC, First Search for Application No. CN 201680057291 (CN 108139754 A), dated Sep. 2, 3030 (in Chinese with English translation from Global Dossier).
US PTO, Third-Party Submission Under 37 CFR 1.290, including "Concise Description of Relevance," submitted by Steven Sounyoung Yu in U.S. Appl. No. 15/948,974, Dec. 16, 2018 [9 pgs.].
USPTO, Non-Final Office Action for U.S. Appl. No. 15/948,974, dated Feb. 9, 2021, [14 pgs.].
USPTO, Final Office Action for U.S. Appl. No. 15/948,974, dated Feb. 4, 2021, [15 pgs.].
USPTO, Final Office Action for U.S. Appl. No. 15/948,974, dated Jul. 17, 2020, [13 pgs.].
USPTO, Non-Final Office Action for U.S. Appl. No. 15/948,974, dated Mar. 2, 2020, [11 pgs.].

* cited by examiner

METHOD AND SYSTEM FOR AUTONOMOUS OR SEMI-AUTONOMOUS DELIVERY

RELATED APPLICATIONS

This application is a continuation of co-pending application Ser. No. 15/948,974, filed Apr. 9, 2018, which is a continuation of PCT/EP2016/074620, filed Oct. 13, 2016, the entire contents of each of which are hereby fully incorporated herein by reference for all purposes. PCT/EP2016/074620 claims priority from European patent applications (i) 15189661.0, filed Oct. 13, 2015, (ii) 15192649.0, filed Nov. 2, 2015; and (iii) 15192648.2, filed Nov. 2, 2015, the entire contents of each of which are hereby fully incorporated herein by reference for all purposes.

FIELD

The invention relates to autonomous and semi-autonomous mobile robots, in particular robots for transporting deliveries in an unstructured outdoor environment.

INTRODUCTION

Autonomous and semi-autonomous mobile robots is a growing field of innovation. It is used for many purposes from warehouse operations to household vacuuming robots, hospital delivery robots, and military or defence applications. Often, a robot communicates with a server to exchange data related to for example robot diagnostics, task status and/or instructions. The server can be for example a cloud server and/or a collection of servers.

US Patent application 2013/0332021 describes a system for monitoring and protecting an area. The system includes a plurality of fully autonomous and collaborating Unmanned Ground Vehicles (UGVs), each of which carries a plurality of sensors; a monitoring module; an operating module; and a Graphical User Interface (GUI) adapted to include threat characteristics analysis.

The system is adapted for defence applications and is fully autonomous. It is used primarily for perimeter monitoring and is not optimized for chaotic outdoor environments.

U.S. Pat. No. 9,031,692 B2 discloses a cloud robot system comprising a cloud computing platform and at least one robot. The cloud computing platform is used for receiving performance information sent by the at least one robot in the system, processing the data and status, sending process results back to the at least one robot, and sending control instructions to corresponding robot according to the requests. The at least one robot is used for sending the performance information to the cloud computing platform, receiving process results from the cloud computing platform, and performing according to the control instructions sent from the cloud computing platform.

The patent does not disclose physical location for the storage, maintenance and resupplying of the at least one robot. It also does not provide practical applications.

U.S. Pat. No. 8,948,914 B2 discloses a system including an apparatus and a server. The apparatus is configured for securely transporting an item from a first location to a second location, and includes a mobile robot and a cart. The cart is coupled to the mobile robot and includes at least one secure storage area. The server is communicably connected to the apparatus and includes a module. The module is configured to maintain a chain of custody record for the item.

The system is intended to operate in structured environments, for example in a hospital. It is not suitable for autonomous operation in outdoor environments.

WO 2011/035839 A2 describes a system of mobile robots with a base station.

The position determination of a robot is done on the basis of the distance determination to reference emitters, which would be the base station or other robots. The robots stay within range of communication either with other robots or with the base station.

US patent application 2014/0136414 discloses a method, device and system of an autonomous neighborhood vehicle commerce network in a community. An autonomous neighborhood vehicle includes a set of wheels aligned in a pattern to provide the autonomous neighborhood vehicle stability while traversing a sidewalk, a bike lane and a roadway. The autonomous neighborhood vehicle has an electronic locking mechanism and a storage compartment which is capable of storing items. The embodiment includes a computer system of the autonomous neighborhood vehicle communicatively coupled to a commerce server of a neighborhood communication system through a wireless network to autonomously navigate the autonomous neighborhood vehicle to a destination specified by the commerce server. A navigation server of the autonomous neighborhood vehicle provides a remote sensing capability to the autonomous neighborhood vehicle such that the autonomous neighborhood vehicle is autonomously navigable to the destination.

US patent application 2014/0081445 provides methods and systems for automated delivery using a delivery vehicle transported by a carrier vehicle. The automated delivery method comprises receiving, by a processing device, an order from a buyer. The order specifies one or more products to be delivered to the buyer and itinerary information. The processing device transmits the order to a placer robot. The placer robot positions the one or more products to a delivery vehicle. A carrier vehicle transports the delivery vehicle to a delivery destination based on the order. The carrier vehicle is driverless and lightweight and moves automatically. The carrier vehicle moves on a flat track using itinerary information of the order.

SUMMARY

The present invention is specified in the claims as well as in the below description. Preferred embodiments are particularly specified in the dependent claims and the description of various embodiments.

In a first aspect, the invention provides a mobile delivery robot. The robot comprises at least one sensor, and at least one computing module adapted to at least analyse sensor data. The robot further comprises at least one communication module adapted to at least send and receive data. The robot also comprises at least one delivery compartment adapted to store at least one delivery.

In a second aspect, the invention provides a system comprising (i) at least one server that is adapted for at least coordinating communication within the system, receiving, storing data, sending data and/or performing computational analysis, (ii) at least one robot that operates autonomously or semi-autonomously and that is adapted to communicate with the server, and (iii) at least one hub that is adapted to perform at least one function selected from: storage, maintenance, repair and resupply of the robot.

In a third aspect, the system comprises (i) at least one server that is adapted for at least coordinating communication within the system, receiving, storing data, sending data and/or performing computational analysis, (ii) at least one robot that operates autonomously or semi-autonomously and that is adapted to communicate with the server; (iii) at least one delivery terminal communicating with the at least one robot and/or the at least one server.

In a fourth aspect, a method making use of the system is provided. The method can make use of any features of the system listed above and below. The method comprises providing a system comprising at least one server, at least one robot and at least one delivery terminal, the method comprising steps of: (i) communicating a request for at least one delivery from the at least one delivery terminal to the at least one server and/or to the at least one robot; (ii) providing instructions from the at least one server to the at least one robot about the at least one delivery, the instructions comprising information about the final delivery location or first delivery location; (iii) loading the at least one robot with the at least one delivery to be transported; (iv) transporting the at least one delivery in the at least one robot to the final delivery location or first delivery location; and (v) providing access to the at least one delivery in the at least one robot.

The server can comprise multiple servers and/or a cluster of servers and/or one or more cloud servers. In one preferred embodiment, the server is a cloud server. In another embodiment, the server comprises a cluster of servers, some of which can be cloud servers. The server is adapted to at least communicate with the other elements of the system and, in one embodiment, to coordinate the communication between all of them. The server can further store, analyse and/or send out data, such as for example map and localization related data. That is, in some embodiments, the robot is adapted to map its surroundings and localize itself based on such a map. The mapping and/or localization can be performed on the robot and/or on the server and/or be split between the two. The server can also perform calculations, for example calculations related to the generation of a geographical map, localization calculations or route calculations for the robot.

The robot can be an autonomous or a semi-autonomous robot. This means that the robot can operate fully autonomously, or alternatively the robot can operate autonomously in part and in part be operated by an operator. The operator can for example be a human operator. The robot can be land-based, i.e. the robot moves on the ground, and adapted for motion in unstructured outdoor environments. Such unstructured environment can for example be an urban, suburban and/or rural environment. An unstructured outdoor environment can comprise pedestrian paths including moving obstacles such as pedestrians, animals, vehicles (such as wheelchairs, bicycles and/or strollers) and/or stationary obstacles such as street signs, garbage bins and/or mailboxes; traffic roads including moving vehicles (for example cars, trucks and/or motorbikes), traffic lights and/or traffic signs; and/or other traversable environments such as parking lots, sport courts, lawns and/or fields. In one embodiment, the unstructured environment contains at least one moving obstacle.

The robot can be adapted to move with a speed of no more than 20 km/h, or no more than 15 km/h, or no more than 10 km/h, or no more than 8 km/h, or no more than 6 km/h, preferably between 3 and 6 km/h or, more preferably, between 4 and 5 km/h. The robot can comprise a multitude of sensors for internal and external measurements of its surrounding environment, to provide an assessment of the robot's surroundings. Those sensors can for example include one or more GPS modules, one or more visual modules such as cameras, one or more audio modules for two-way communication, one or more accelerometers, one or more gyroscopes, one or more compasses, one or more Time of Flight cameras, one or more ultrasonic sensors, one or more Lidar (light radar) components, one or more laser based sensors, one or more magnetometers, one or more stereo visual modules such as stereo cameras, one or more altitude sensors, and/or one or more odometers. In some embodiments, measurements provided by the one or more sensor are communicated to the server, which performs an analysis of the measurements, and communicates to the robot a command as a result of such analysis. Such a command may for example include a change in the speed of the robot, and/or a change in the path that the robot is following. The command may also direct the robot to continue along its previously assigned route. In another embodiment, the robot can give such commands to itself.

The robot can further comprise a communication module for communicating with the other elements of the system (for example one or more Subscriber Identity Modules (SIM cards)), and/or a computing module for analysing for example sensor data. The communication module can comprise a network device. In a preferred embodiment, the communication module comprises at least two network devices. Such network devices could comprise a modem, a mobile identification module, and/or a SIM card. In a preferred embodiment, the robot comprises two SIM cards and/or mobile identification modules (such as eSIM's and/or a similar chip/system) and/or modems. This can create redundancy in case one SIM card and/or mobile identification module and/or modem is out of communication range and/or fails. In another embodiment, this can be used to transfer information simultaneously via both SIM cards and/or mobile identification modules and/or modems. In some preferred embodiments, the robot is adapted to switch between transferring data via one network device to transferring data via the other network device efficiently and promptly. This is advantageous, as mobile operators generally have different coverage areas. For example, as the mobile robot navigates in an outdoor environment, one of the network devices could lose reception. In this case, the robot can still use the other network device to communicate with the server and/or with other elements of the system. Further, if one of the network devices such as a SIM card and/or mobile identification module and/or a modem reaches the limit of its available data transmission (such as a standard monthly and/or daily limit that many network service providers impose on network devices), the robot can still communicate via the other network device. In another preferred embodiment, the robot comprises a Graphics Processing Unit (GPU) and/or a Central Processing Unit (CPU). The system can comprise more than one robot in communication with the server and/or with each other.

The robot can comprise a set of wheels on which a frame is mounted. In some embodiments, the robot has at least four wheels. In some preferred embodiments, the robot comprises six wheels. The robot can have a body mounted on the frame. The body can comprise a delivery compartment. Said delivery compartment can be covered by a lid. The lid can comprise a lock adapted to assume at least an open and a closed state. In an open state, the delivery compartment can be accessed, while in a locked state it can remain inaccessible. In some embodiments, the robot can comprise multiple delivery compartments. Said multiple delivery compartments can comprise individual lids and/or be accessible individually. The robot can comprise a flag or an antenna for increased visibility. The robot can comprise lights such as LED lights for increased visibility. The robot can comprise a plurality of sensors places around the body, the frame, on the wheels, and/or within the robot. For example, the robot can comprise a plurality of visual sensors, such as cameras, placed around the body of the robot in a manner to be able to take visual images of the robot's surroundings from a plurality of sides. The robot can preferably comprise at least four visual cameras, such as six visual cameras, such as seven visual cameras, such as eight visual cameras, such as nine visual cameras. The robot can also comprise ultrasonic sensors placed around the body in a manner to detect objects around the robot.

The hub can be a physical location (for example a parking lot), a physical structure (for example a house, a warehouse, a shipping container, a barn, a depot and/or a garage), and/or a mobile structure (for example a truck, a trailer and/or a train wagon). The hub can also be located at a department store and/or at a restaurant and/or at another business. The system can comprise more than one hub. The hub can comprise a communication module or component for communicating with any of the other elements of the system. This communication module may comprise at least one network device. Such a network device can comprise one or more SIM cards and/or one or more routers and/or one or more modems and/or one or more mobile identification modules. The hub and/or the hub's communication module can further and/or alternatively comprise a wireless packet based private network and/or a wireless internet. That is, the hub can support a WiFi. In some embodiments, the robot and/or the robots can connect to the hub's WiFi. This can be advantageous when transferring large amounts of data, as WiFi can provide a higher speed and/or a great data allowance than a mobile connection. In some embodiments, the network within the hub can be an existing network of a business where a hub is located. That is, for example, if a hub is within a restaurant, a supermarket and/or a delivery service center, the hub can use an existing WiFi connection for its own communications. Alternatively or additionally, the hub can have an own wireless packet based private network. Such a network could, for example be based on WiMAX, advanced WiFi, or similar The hub can serve as a loading, storage, maintenance, repair, recharge and resupply station for the robots. The robots can be loaded with one or more deliveries at a hub. The robots can further be charged at a hub and/or have their empty or low battery swapped out for a charged one. One hub can comprise one or more robots. In a preferred embodiment, one hub comprises 20-200 robots. That is, one hub can be adapted to store between 20 and 200 robots. In some other embodiments, that hub may be a smaller local hub. It can, for example, comprise a storage container. In such embodiments, the hub can be adapted to store 5-20 robots. In some other preferred embodiments, a hub may comprise 1-5 robots. For example, a hub may comprise a specially designated area within a business such as a supermarket, a delivery station, an electronics shop, a department store, a restaurant or another business. Such a hub can comprise only a few robots, such as one robot, or two robots, or three robots, or four robots, or five robots depending on the needs of the business to which the robots are assigned.

The robot can be adapted to transport deliveries from one location to another, for example from the hub to the delivery location and/or from peer to peer. The system may thus be used for transporting deliveries. A delivery, in this context, refers to any physical item that can be desirable to transport between locations. A delivery can for example include parcel(s), mail, package(s), groceries, purchases, plants, flowers, take-out, food, drinks, or the like. The delivery can be stored in a compartment within the robot during the transportation. In some embodiments, the robot comprises a plurality of delivery compartments adapted to be accessed individually. In some embodiments, the robot carrying a delivery weighs no more than 40 kg, such as no more than 35 kg, such as no more than 30 kg, such as no more than 25 kg, preferably between 15 and 25 kg, more preferably between 20 and 25 kg.

The system can be or be a part of a peer-to-peer service with the robots serving as a delivery agent. The system can also be or be a part of a delivery service for business-to-business and/or business-to-consumer purposes. For example, the system can be adapted to transport deliveries between any combination of shops, supermarkets, grocery stores, department stores, postal companies, shipping companies, online shops and/or individuals. In some preferred embodiments, the system can be adapted to transport deliveries to/from grocery stores and/or supermarkets, restaurants and/or take-out services and/or food delivery businesses, delivery businesses. In other embodiments, the system can be adapted to transport deliveries to/from rental services, such as tool rental services for example. The deliveries can be stored at a hub, where they would be transported to either by the system, and/or by means external to the system. The system can contain a delivery terminal used for requesting a delivery. This can be done through the server or by direct communication between the delivery terminal and the robot. The delivery terminal can also communicate directly with the hub. The delivery terminal can communicate by wire or wirelessly with the server, the hub and/or the robot. The delivery terminal can be any one or more of the following: a computer, a laptop, a tablet, a cell phone, and/or a wearable computing device (such as a watch, a ring, a bracelet, glasses, and/or contact lenses). Essentially, the delivery terminal can comprise any one or a combination of computing devices adapted to be manipulated by a user. The delivery can be requested through an app (such as a mobile app and/or a tablet app and/or a wearable computing device app) and/or through a browser-based method. The time and location of the delivery can be confirmed and/or specified during requesting a delivery. The delivery will be transported to the delivery recipient specified by the delivery location. The delivery recipient can be at another location than the delivery terminal. The delivery recipient can be a person and/or a location where the delivery will be left.

In another preferred embodiment, the system may further comprise an operator terminal. The operator terminal can comprise at least one device such as a computer, a cell phone, a tablet, or a wearable computing device. The operator terminal can further comprise at least one operator, preferably a human operator. The operator terminal can communicate with the robot, for example during the semi-autonomous mode of the robot. This communication may be coordinated by the server. The robot can send a request for input to the server when faced with a hazardous, and/or unexpected setting. The robot can further send a request for input while identifying a delivery recipient. A hazardous and/or unexpected setting can include crossing a street and/or interacting with elements of the environment such as pedestrians, animals, cyclists, and/or vehicle drivers. The operator terminal can control the robot (for example as it operates along a road, crosses a street, at a traffic light and/or at a pedestrian crossing), receive data from the robot sensors and/or from the server and send data such as voice input (for example to address persons in the immediate environment of the robot). The operator terminal can control more than one robot. There can be more than one operator terminals. In one embodiment, the function of the operator terminal can be provided by the server.

In yet another preferred embodiment, the server can make decisions about the system and/or about its individual elements, and can provide commands to the hub, and/or to the robots based on such decisions. For example, once the server receives a request for delivery, it can contact the hub and/or one of the robots assigned to the hub where the delivery is stored. Alternatively, the server can contact the hub and/or the robot that is closest to the current location of an item to be delivered. The server can communicate instructions comprising information about the route to be taken for the delivery and/or the identity of the delivery. One hub can serve an area of 2-10 square kilometres. In an urban setting, one hub can serve an area of 2,000-10,000 inhabitants and/or 500-5,000 businesses. The robot picked for the delivery by the server and/or by the hub is then loaded with the delivery manually, automatically and/or loads itself autonomously (potentially using input from the server and/or from the hub) and leaves the hub.

In another embodiment, the robot first navigates to the initial location of the delivery and is loaded with it and/or loads itself, for example by gripping means. The robot could also be loaded automatically via additional equipment in the hub, and/or be loaded manually by hub personnel. The robot then navigates to the location of the delivery and/or the first delivery location. During the navigation, the robot can request an input from the operator terminal. The delivery recipient and the delivery terminal do not have to be at the same location. For example, the delivery terminal can be an office computer operated by a third party, while the delivery recipient may be in a different physical location. Once at the delivery location, the robot can leave the delivery and/or proceed to check the identity of the delivery recipient. The identity control can be done via a barcode, Bluetooth, Near Field Communication (NFC), fingerprinting, visual authentication, voice authentication and/or the like and/or by entering an access code on the robot. In some preferred embodiments, the identity control can be done via mobile identity. That is, it could be done based on a mobile device of the delivery recipient, whether by SIM card/number/mobile identification module based authentication, or by an action related to an app, such as an app-based identification and/or identity confirmation. The identification can be done via the delivery terminal In another embodiment, the delivery can be released by a command from the server and/or from the operator terminal. Delivery is released by providing access to the delivery, for example by opening a compartment in the robot, either automatically and/or following a command from the delivery recipient. In yet another embodiment, the delivery is released by the robot once the delivery location is reached. Once the delivery is completed, the robot navigates back to the hub. The robot can also navigate to a different hub based on for example a command from the server and/or from the operator terminal.

In some preferred embodiments, the robot can navigate to several distinct delivery locations to deliver a plurality of deliveries. For example, the robot can be loaded at a hub or elsewhere, and start navigation to a first delivery location. Once the robot delivers the delivery at a first delivery location, the robot can proceed to navigate to a second delivery location. The robot can then make its delivery at a second delivery location and proceed to the next delivery location and/or return to a hub or travel elsewhere. This can be advantageous, as the robot can make several deliveries in the course of one robot run. In this way, less energy can be used, as the robot does not have to return to the hub between each delivery, and time can be used more effectively for the same reason.

Below, further numbered embodiments of the invention will be discussed.

1. A system comprising
    (a) at least one server adapted for at least: coordinating communication within the system, receiving/storing/sending data and/or performing computations;
    (b) at least one robot operating autonomously or semi-autonomously and adapted to wirelessly communicate with the at least one server; and
    (c) at least one hub and that is adapted to perform at least one of: storage, maintenance, repair and/or resupply of the at least one robot.
2. A system comprising
    (a) at least one server adapted for at least: coordinating communication within the system, receiving/storing/sending data and/or performing computations;
    (b) at least one robot operating autonomously or semi-autonomously and adapted to communicate with the at least one server in order to facilitate transport of a delivery by the robot to at least one recipient; and
    (c) at least one delivery terminal communicating with the at least one robot and/or the at least one server.
3. A system according to embodiment 1, wherein the communication between the robot and the server in (b) is adapted to facilitate transport of a delivery by the robot to a recipient, and wherein the system further comprises at least one delivery terminal communicating wirelessly with the robot.
4. A system according to any one of the embodiments 2 or 3, wherein the communication between the robot and the delivery terminal is done via the server.
5. A system according to any of the preceding embodiments further comprising at least one operator terminal for at least controlling the robot during the semi-autonomous mode of operation.
6. A system according to the preceding embodiment where the operator terminal is adapted to control multiple robots.

In some preferred embodiments, the operator terminal is further adapted to monitor the robot during autonomous operation and take over the control of the robot if it is needed or desirable.

7. A system according to any of the preceding embodiments wherein the server comprises a cluster of servers and/or one or more cloud based servers tasked with at least one or a combination of: coordinating communication within the system, receiving/storing/sending out data and/or performing computations.
8. A system according to any of the preceding embodiments where the communication, preferably at least between the server and the robot, within the system is provided via cellular networks.
9. A system according to any of the preceding embodiments wherein the server, the robot, the hub, the operator terminal and/or the delivery terminal comprise at least one communication module for communication within the system.
10. A system according to embodiment 9 where at least one communication module comprises at least one slot for at least one Subscriber Identity Module (SIM card), preferably 2 slots for 2 SIM cards.

In some preferred embodiments, the communication module comprises at least one network device, preferably two network devices. That is, the communication module can comprise at least one or a combination of a modem, a mobile identification module, and/or a SIM card.

11. A system according to any of the preceding embodiments comprising at least two robots operating autonomously or semi-autonomously and communicating at least with the server.
12. A system according to any of the preceding embodiments where the robot is land-based.
13. A system according to any of the preceding embodiments where the robot is adapted to travel with a speed of no more than 10 km/h, or no more than 8 km/h, or no more than 6 km/h, preferably between 3 and 6 km/h or, more preferably, between 4 and 5 km/h.

In some preferred embodiments, the robot can be adapted to travel with a speed of no more than 20 km/h. This can be particularly advantageous in unstructured outside environments without a dense stream of pedestrian traffic or slower traffic. For example, on residential streets lacking a sidewalk, the robot can be adapted to move directly on the street with a speed of no more than 20 km/h.

14. A system according to any one of the embodiments 1 or 3 to 13, where the robot is used for delivery purposes.
15. A system according to any one of embodiments 1 or 3 to 14 further comprising at least one delivery terminal communicating with the robot.
16. A system according to any of the preceding embodiments wherein the communication between the delivery terminal and the server includes requesting a delivery and/or receiving delivery information.
17. A system according to any one of embodiments 1 or 3 to 16 where the robot and its delivery weight no more than 40 kg, such as no more than 35 kg, such as no more than 30 kg, such as no more than 25 kg, preferably between 15 and 25 kg, more preferably between 20 and 25 kg.
18. A system according to any of the preceding embodiments where the robot comprises a multitude of sensors for collecting internal and external information.

In some preferred embodiments, the robot comprises sensors that can comprise at least one or a combination of one or more GPS modules, one or more visual modules such as cameras, one or more audio modules for two-way communication, one or more accelerometers, one or more gyroscopes, one or more compasses, one or more Time of Flight cameras, one or more ultrasonic sensors, one or more Lidar (light radar) components, one or more laser based sensors, one or more magnetometers, one or more stereo visual modules such as stereo cameras, one or more altitude sensors, and/or one or more odometers.

19. A system according to any of the preceding embodiments where the server receives sensor data from the robot and performs at least one or a combination of: storing, analyzing and/or making decisions based on the received data.
20. A system according to any one of embodiments 1 or 3 to 19 where the hub comprises at least one or a combination of: a storage container, a warehouse, a truck, a trailer, a train wagon, a shop, and/or a building.
21. A system according to any one of embodiments 1 or 3 to 20 where the hub comprises means for storage, maintenance and/or resupply of a plurality of robots, preferably from 20 to 200 robots.

In some preferred embodiments, the hub can comprise from 5 to 20 robots. This can be particularly advantageous in embodiments where the hub comprises a smaller sized shipping container and/or a truck. Additionally or alternatively, this can be advantageous in embodiments wherein the hub comprises a certain area within a business, such as a room on the premises of a department store and/or a supermarket and/or a post or delivery office. In such embodiments, it can be advantageous to store from 5 to 20 robots or even from 1 to 5 robots on the premises of a given business within a hub.

22. A system according to any of embodiments 2 or 3 to 21 where the delivery terminal comprises at least one or a combination of: a mobile phone, a computer, a tablet, a watch, a wearable device with input and output structures and/or a glasses-type communications apparatus.
23. A system according to any of the preceding embodiments where the robot is adapted for operation in an unstructured outdoor environment.
24. A system according to the preceding embodiment where the robot is adapted for operation in the unstructured outdoor environment comprising at least one or a combination of pedestrian paths including obstacles such as pedestrians, animals, cyclists, street signs and/or mailboxes; traffic roads including traffic lights; vehicles and/or cyclists; and other traversable environments such as parking lots, lawns and/or fields.
25. A system according to any of the preceding embodiments wherein the delivery is transferred from the robot to the delivery recipient using an authentication method such as a barcode, Bluetooth, NFC, fingerprinting, visual or voice authentication and the like, and/or by entering an access code on the robot, and/or by using the delivery terminal and/or by the robot autonomously transferring the delivery to the delivery recipient.

In some embodiments, the authentication method also comprises using a mobile identity. That is, the delivery terminal can comprise a mobile phone or a similar device, and in such embodiments authentication can be done via a mobile identity by the delivery recipient.

26. A system according to any of the preceding embodiments wherein the communication within the system is wireless.
27. A system according to any of the preceding embodiments and with features of embodiment 1 wherein the hub comprises at least one communication module, said communication module preferably comprising a wireless packet based private network.
28. A delivery method, comprising:
  providing a system comprising at least one server, at least one robot and at least one delivery terminal, the method comprising steps of:
  (a) communicating a request for at least one delivery from the at least one delivery terminal to the at least one server and/or to the at least one robot;
  (b) providing instructions from the at least one server to the at least one robot about the at least one delivery, the instructions comprising information about the final delivery location;
  (c) loading the at least one robot with the at least one delivery to be transported;
  (d) transporting the at least one delivery in the at least one robot to the final delivery location; and
  (e) providing access to the at least one delivery in the at least one robot, preferably upon arrival at the delivery location.

29. The method according to embodiment 28 wherein the method is adapted to operate the system that is provided is according to any one of the embodiments 2 to 27.

30. The method according to any one of embodiments 28 to 29 further comprising authenticating the delivery recipient before providing access to the delivery in the robot.

The authentication can comprise at least one or a combination of the following authentication methods: a mobile identity, barcode, Bluetooth, NFC, fingerprinting, visual or voice authentication and the like and/or entering an access code on the robot, and/or using the delivery terminal and/or the robot autonomously transferring the delivery to the delivery recipient.

31. The method according to any one of embodiments 28 to 30 further comprising communicating the arrival of the delivery in the robot at the final delivery location to the delivery terminal.

32. The method according to any one of embodiments 28 to 31 wherein providing access comprises opening a compartment in the robot to allow access to the delivery.

33. The method according to any one of embodiments 28 to 32 wherein providing access comprises autonomously delivering the delivery from the robot.

34. The method according to any one of embodiments 28 to 33 wherein the instructions further comprise information about the route to be taken for the delivery and/or identity of the delivery.

35. The method according to any one of embodiments 28 to 34 wherein the delivery transporting includes communication between the robot and at least one operator terminal.

36. The method according to any one of embodiments 28 to 35 wherein the transporting includes at least a partial control of the robot by the operator terminal.

37. The method according to any one of embodiments 28 to 36 wherein the robot transports the delivery to a delivery recipient.

38. The method according to any one of embodiments 28 to 37 further comprising storing, maintaining, repairing, supplying and/or loading the robot within a hub.

39. The method according to any one of claims 28 to 38 further comprising the step of travelling to a second delivery location and providing access to at least one second delivery within the robot.

40. The method according to any one of claims 28 to 39 wherein the robot is loaded with the at least one delivery at a hub and wherein the method further comprises the step of travelling back to the hub after travelling to at least a first delivery location.

BRIEF DESCRIPTION OF THE DRAWINGS

The skilled person will understand that the drawings, described below, are for illustration purposes only. The drawings are not intended to limit the scope of the present teachings in any way.

DESCRIPTION OF VARIOUS EMBODIMENTS

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps, can be present between some or all of the described steps.

Figure 1:
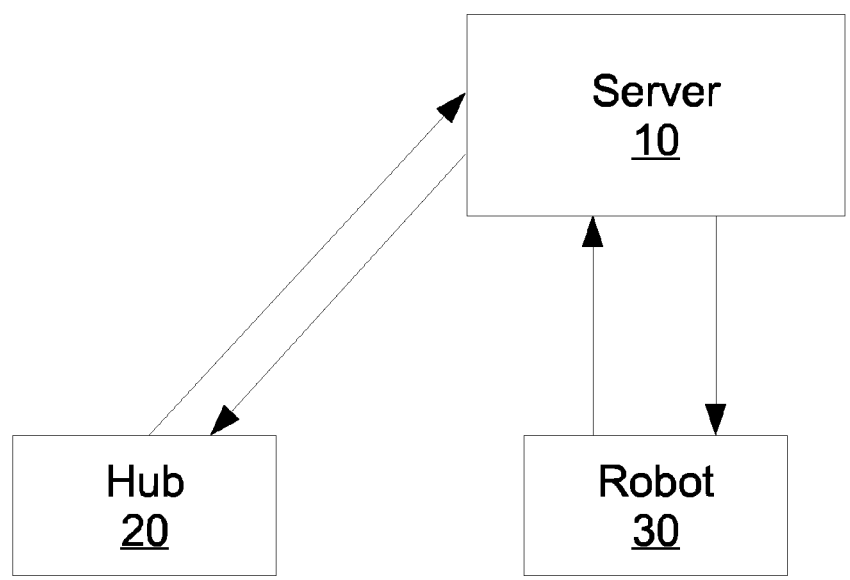
FIG. 1 shows an embodiment of a server-hub-robot system according to the invention.

Referring to FIG. 1 an example of a system according to one embodiment of the invention is shown. Server 10 is coordinating the communication between itself, hub 20 and robot 30. Hub 20 can be a physical location or a physical structure such as a shipping container, a warehouse, a depot, a garage and/or a house. Hub 20 can also be mobile, for example a truck, a trailer or a train wagon. Hub 20 can be used to store, maintain, repair, recharge, and/or resupply robot 30. Server 10 can make decisions about the system, and can provide commands to the hub 20 and/or robot 30 based on such decisions. Server 10 may be a cloud-based server, a cluster of servers and/or a virtual server. Hub 20 is communicating with server 10 and/or robot 10. In one embodiment hub 20 sends data concerning the robots 30 or deliveries (not shown) located on its premises to the system. The system can also receive information about the local weather, further deliveries and additional robots 30. The weather information may be received by the server 10 and distributed to the hubs 20 based on their location, and/or received by the hub 20 based on local measurements and/or sent directly to the robot 30 by the server. Robot 30 communicates with server 10 concerning internal diagnostics, external data perceived by the robot sensors and localization related information. Robot 30 may receive data from server 10 concerning the surroundings of robot 30, its current objective and delivery information. Robot 30 may receive information from server 10 regarding its current or upcoming path information and send information back to server 10 if there is a discrepancy in the received information and the reality perceived through the sensors of the robot 30.

Figure 2:
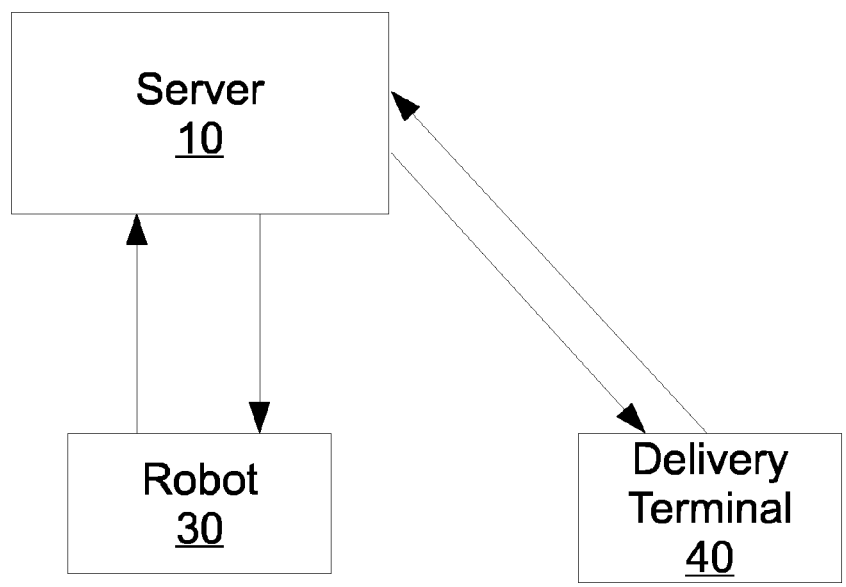
FIG. 2 shows an embodiment of a server-robot-delivery terminal system according to the invention.

FIG. 2 shows another embodiment of the system according to the invention. Server 10 coordinates communication between itself, robot 30 and delivery terminal 40. Robot 30 is tasked with transporting a delivery (not shown) to a location specified by the delivery terminal 40. Delivery terminal 40 can send request for a delivery to the server 10 specifying the time and location of the delivery. Alternatively, time and/or location information can be determined by server 10. Server 10 then forwards this information to robot 30. Delivery terminal 40 can be a personal computer, a laptop, a cell phone, a tablet, and/or a wearable computing device such as a watch, a wristband, a ring, glasses and/or contact lenses. Delivery terminal 40 does not have to be at the same physical location the delivery will be transported to. The delivery may be received by the delivery recipient 60, not pictured here.

Figure 3:
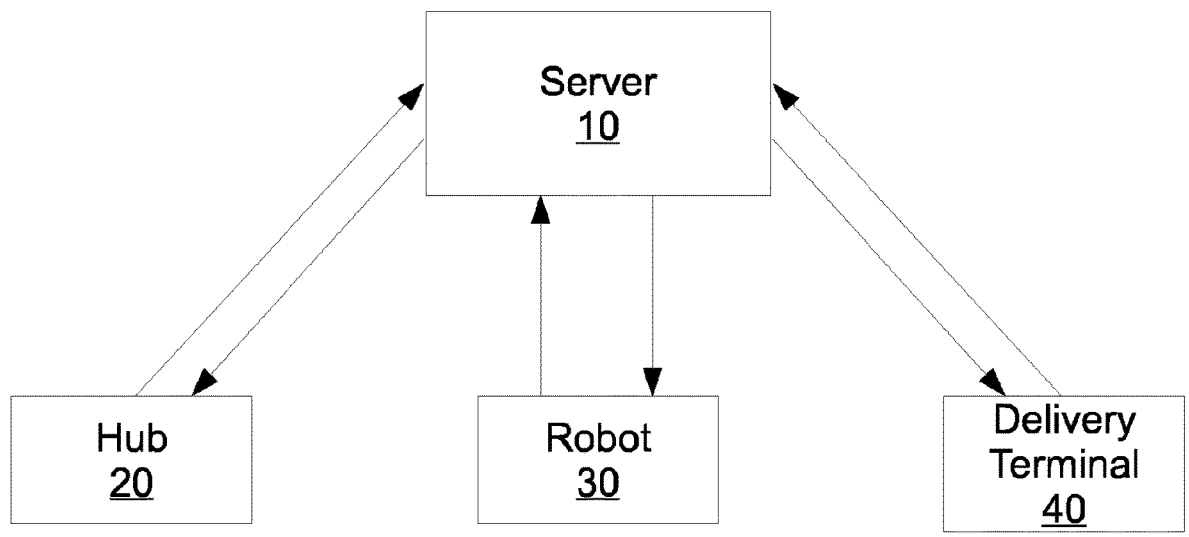
FIG. 3 shows an embodiment of a server-hub-robot-delivery terminal system according to the invention.

FIG. 3 presents yet another embodiment of the system according to the invention. In this embodiment, there is a server 10, a hub 20, a robot 30 and a delivery terminal 40. Although a single robot 30 and single delivery terminal 40 are shown, there can be a plurality of robots and delivery terminals. Hub 20 may serve as a storage location for multiple deliveries (not shown) to be taken to the delivery recipient 60 (not shown) by the one or more robots 30. One hub 20 may serve an area of 2-10 square kilometres. The system can also contain multiple hubs 20. As before, server 10 coordinates communication between all the elements of the system.

Figure 4:
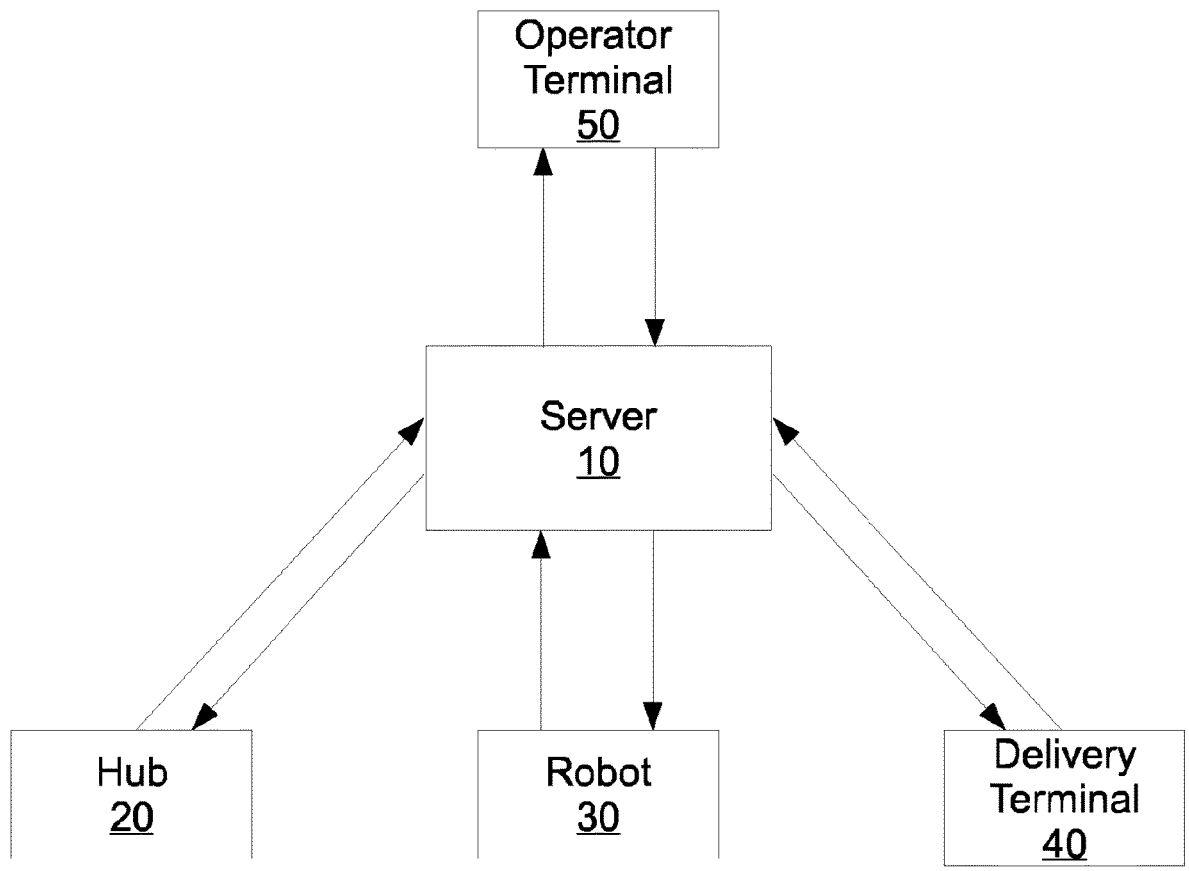
FIG. 4 shows an embodiment of a server-hub-robot-delivery terminal-operator terminal system according to the invention.

Another embodiment of the system according to the invention is shown in FIG. 4. The new element differing it from FIG. 3 is the operator terminal 50. Operator terminal 50 may communicate with the robot 30 through the server 10. Operator terminal 50 may receive data about the robot 30 regarding current location, current task and/or request for input (including textual input, audio input and/or command input). Server 10 receives the data transferred by the operator terminal 50 and forwards it to the robot 30. Robot 30 then acts based on the data sent by operator terminal 50. In one embodiment, operator terminal 50 may send an audio input for communication with the surroundings of robot 30. In another embodiment, operator terminal 50 may control robot 30 in potentially hazardous settings, for example when it crosses a street. Operator terminal 50 may control and/or monitor multiple robots 30 at the same time.

Figure 5:
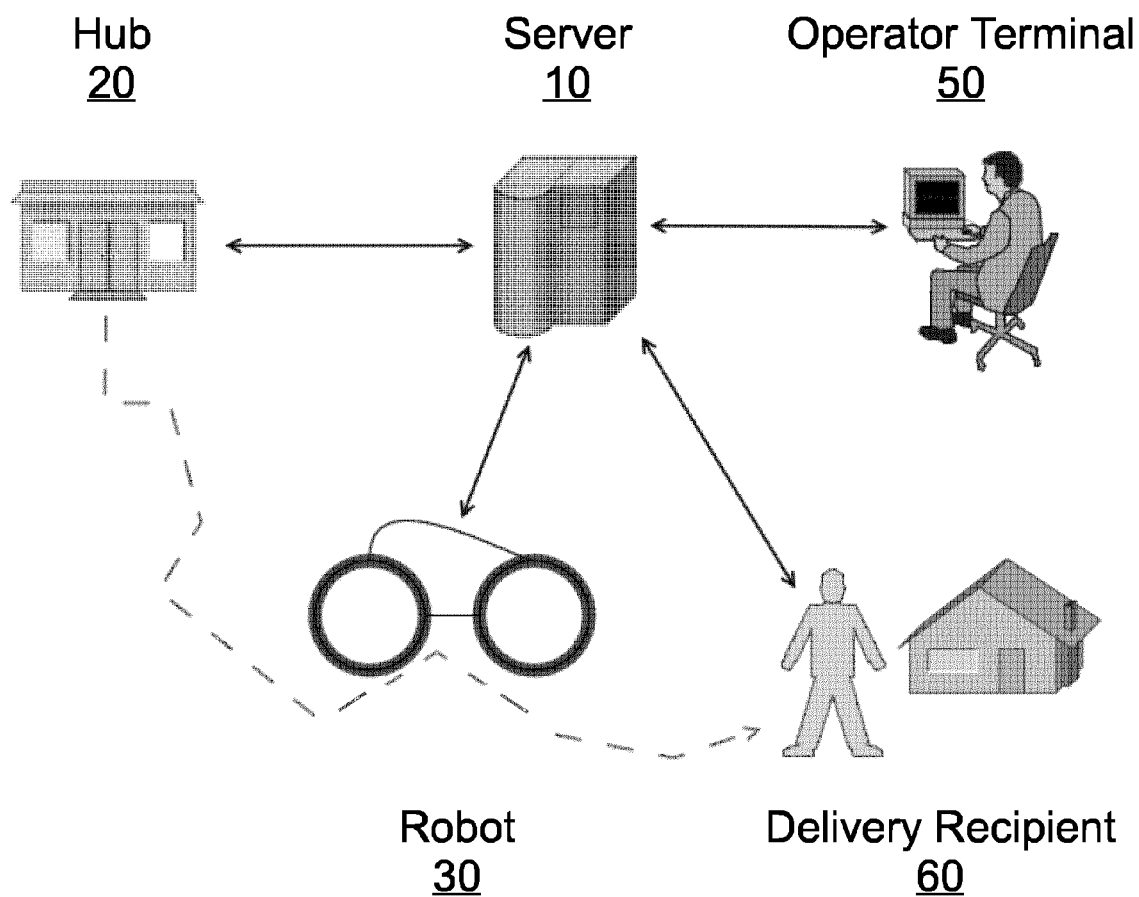
FIG. 5 shows an embodiment of a server-hub-robot-delivery recipient-operator terminal system according to the invention.

One more embodiment of the system according to the invention is shown in FIG. 5. In comparison with FIG. 4, there is a delivery recipient 60 that receives the delivery transported by the robot 30. Delivery terminal 40 is not shown. In one embodiment, delivery recipient 60 orders a delivery using a delivery terminal 40. In another embodiment, delivery recipient 60 is only receiving the delivery at the location specified by the system. In one embodiment, one or more robots 30 are stored, maintained and/or resupplied inside one or more hubs 20. Deliveries may arrive to one or more hubs 20 from for example shipping companies, stores, online stores, and/or post companies. The deliveries would be stored at hub 20 until a delivery request from a delivery terminal 40. Delivery terminal 40 may be operated by a delivery recipient 60. The delivery request may be received by the server 10 and directed to one of the robots 30 located in the hub 20 housing the delivery. Upon receiving the delivery request, robot 30 may be loaded with the delivery or load itself autonomously. Robot 30 then leaves the hub 20 and navigates autonomously or semi-autonomously towards the location of the delivery. This navigation may be done in an urban, suburban and/or rural environment. During the navigation, the robot 30 may operate autonomously unless a hazardous setting, such as crossing a road is encountered. In this case, robot 30 may cease motion and request an input from operator terminal 50. This may be done through the server 10. Operator terminal 50 may control the robot 30 or may send data including potentially audio data to facilitate interaction with the surroundings of the robot 30. Once the setting is no longer hazardous, robot 30 may switch back to an autonomous mode of operation. Robot 30 can operate on pedestrian paths. Once the robot 30 reaches the delivery recipient 60, the delivery is completed. In one embodiment, the delivery recipient 60 accesses the delivery using an authentication method, such as a mobile identity, barcode, Bluetooth, NFC, fingerprinting, visual authentication, voice identification, or the like, or by entering an access code on the robot 30 and/or on the delivery terminal 40. The access code can be provided by server 10 to the delivery terminal 40. Alternatively, the delivery can be made accessible through a command from the server 10 or the operator terminal 50. Robot 30 then returns to hub 20, which may be the same hub 20 from which it started the delivery. Alternatively, the robot 30 returns to an alternate hub 20. Alternatively, robot 30 can then proceed to another delivery location or a second delivery location where it can then deliver another delivery. The robot 30 can deliver multiple deliveries in a single robot run. In another embodiment, robot 30 may pick up the delivery elsewhere than the hub 20, and proceed to transfer it to the delivery recipient.

Figure 6:
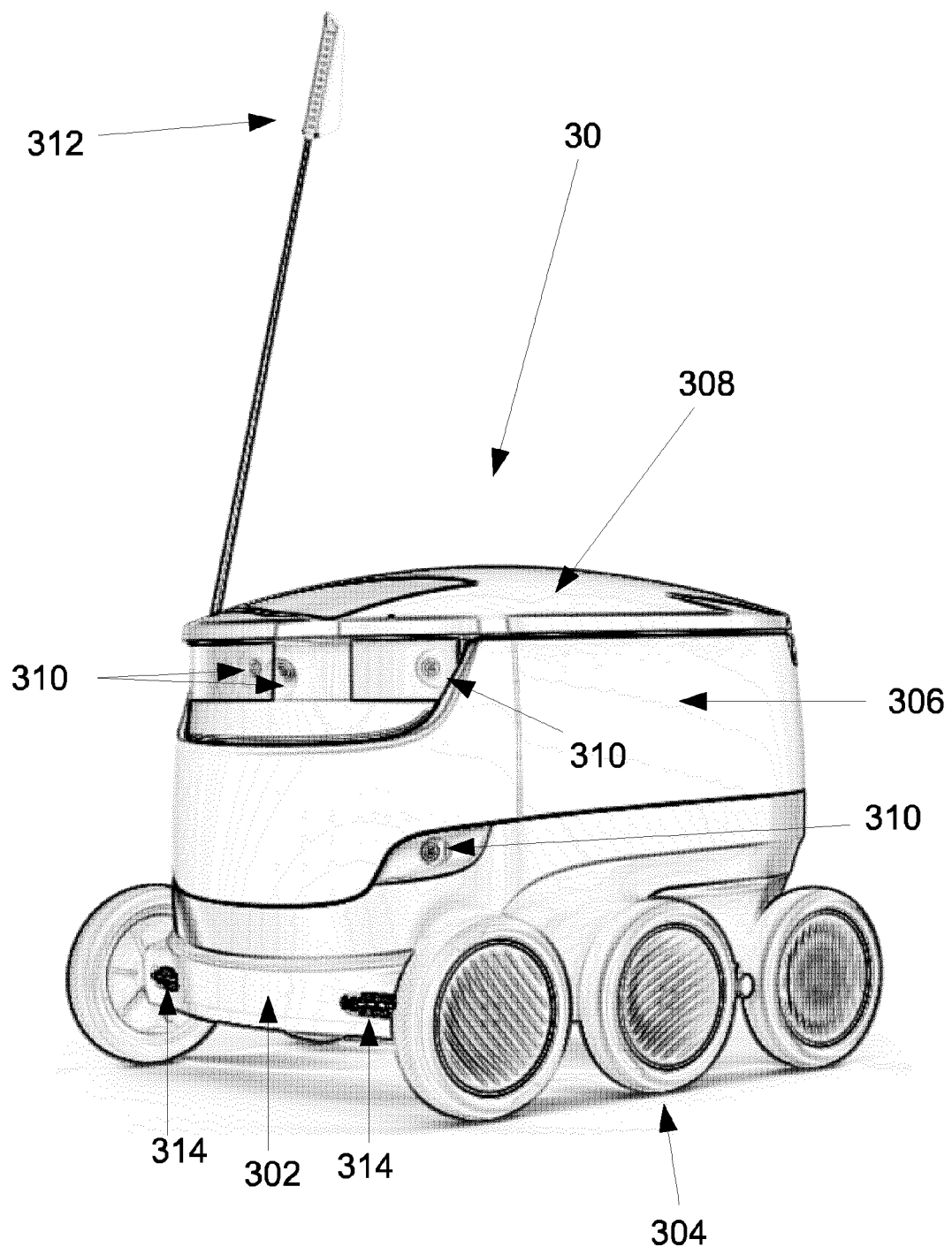
FIG. 6 shows one schematic embodiment of the robot according to the invention.

FIG. 6 shows one exemplary embodiment of a robot 30. The robot 30 may comprise a frame 302 and wheels 304 mounted to the frame 302. In the depicted embodiment, there are provided a total of 6 wheels 304. The robot 30 also comprises a body or housing 306 comprising a compartment adapted to house or store the goods to be delivered to the addressee or the delivery recipient (not shown). This compartment may also be called a delivery compartment. The body 306 may be mounted on the frame 302. The robot 30 also typically comprises a lid 308 for closing the body or housing 306. That is, the cover 308 may assume a closed position depicted in FIG. 5 and an open position. In the closed position, there is no access to the goods in the delivery compartment of the body 306. In the open position of the cover 308 (not depicted), the delivery recipient may reach into delivery compartment of the body 306 and obtain the goods from the inside of the body 306. The robot 30 may switch from the closed position to the open position in response to the addressee performing an opening procedure, such as the addressee entering a code or the addressee otherwise indicating that he/she is in a position to obtain the goods from the robot 30. For example, the addressee may access the delivery compartment by using a smartphone application or the lid 308 may be automatically opened once the delivery location is reached by the robot. The robot 30 may also comprise one or a plurality of sensors 310, e.g., cameras, to obtain information about the surroundings of the robot 30. The robot 30 may also comprise lights 314, such as LEDs. Furthermore, in the depicted embodiment, the robot 30 includes an antenna 312, which may extend upwards. Typical dimensions of the robot 30 may be as follows. Width: 20 to 100 cm, preferably 40 to 70 cm, such as about 55 cm. Height (excluding the antenna): 20 to 100 cm, preferably 40 to 70 cm, such as about 60 cm. Length: 30 to 120 cm, preferably 50 to 80 cm, such as about 65 cm. The weight of the robot 30 may be in the range of 2 to 50 kg, preferably in 5 to 40 kg, more preferably 7 to 25 kg, such as 10 to 20 kg. The antenna 312 may extend to an overall height of between 100 and 250 cm, preferably between 110 and 200 cm, such as between 120 and 170 cm. Such a height may be particularly advantageous such that the antenna 312 and thus the overall robot 30 is easily seen by other traffic participants.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

We claim:

1. A delivery method comprising:
   communicating a request for at least one delivery from at least one delivery terminal to one or more of: (i) at least one server, and (ii) at least one robot, said at least one delivery comprising at least one delivery item;
   providing instructions from the at least one server to the at least one robot about the at least one delivery, the instructions comprising information about a final delivery location;
   transporting the at least one delivery item in the at least one robot to the final delivery location;
   during said transporting, while navigating and operating autonomously on a path intended for pedestrians, animals, wheelchairs, bicycles, and/or strollers, the robot determining that a street is to be crossed by the robot; and then,
      in response to said determining, the robot notifying a server that a street is to be crossed by the robot; and then,
      in response to the notifying by the server, an operator terminal controlling the robot in crossing the street, wherein the operator terminal communicates with the robot through the server,
      wherein the operator terminal receives data from the server indicating a hazardous setting before assuming control; and then,
   after the robot has crossed the street, at least in part under control of the operator terminal, said robot resuming autonomous navigation and operation on said path intended for pedestrians, animals, wheelchairs, bicycles, and/or strollers,
   and wherein the server coordinates communication between the operator terminal and the robot,
   wherein the server receives data transferred by the operator terminal and forwards the data to the robot, and
   wherein the robot acts based on the data sent by the operator terminal via the server, and
   wherein the operator terminal receives data about the robot via the server.

2. The delivery method of claim 1, wherein the method comprises providing access to the at least one delivery item in the at least one robot.

3. The delivery method of claim 1, wherein the method comprises loading the at least one robot with the at least one delivery item.

4. The delivery method of claim 1, wherein the at least one robot ceases motion when facing a potentially hazardous and/or unexpected setting.

5. The delivery method of claim 2, wherein the at least one delivery item is stored in a compartment in the at least one robot during delivery and wherein providing access to the at least one delivery item comprises opening the compartment.

6. The delivery method of claim 2, further comprising authenticating a delivery recipient before providing access to the at least one delivery item.

7. The delivery method of claim 1, wherein the at least one robot carrying the at least one delivery item weighs no more than 40 kg.

8. The delivery method of claim 1, wherein the at least one robot comprises a width of 20 to 100 cm, height of 20 to 100 cm and length of 30 to 120 cm and travels with a speed of no more than 20 km/h.

9. The delivery method of claim 1, wherein the robot is adapted for operation in an unstructured outdoors environment.

10. The delivery method of claim 1 further comprising: the robot navigating to a hub once the delivery is completed.

11. The delivery method of claim 2, wherein providing access to the delivery item occurs upon arrival at the delivery location.

12. A system comprising:
    at least one server adapted for at least: coordinating communication within the system, and for one or more of: receiving data, storing data, sending data, and performing computations;
    at least one robot navigating and operating at least semi-autonomously and adapted to communicate with the at least one server in order to facilitate transport of a delivery by the at least one robot to at least one recipient, said delivery comprising at least one delivery item;
    at least one delivery terminal communicating with one or more of: the at least one robot and the at least one server; and
    an operator terminal, wherein, in response to a request to the at least one server from the at least one robot when faced with a potentially hazardous setting while the robot was navigating and operating autonomously on a path intended for pedestrians, animals, wheelchairs, bicycles, and/or strollers, the operator terminal controls the robot, through the at least one server, in the potentially hazardous setting, after which the robot resumes autonomous navigation and operation, wherein the potentially hazardous setting comprises a street to be crossed by the at least one robot, wherein
    while the operator terminal controls the at least one robot through the at least one server, the at least one server receives data transferred by the operator terminal and forwards the data to the at least one robot and while the operator terminal controls the at least one robot through the at least one server, the operator terminal receives data about the robot via the at least one server, and wherein the at least one robot acts based on data sent by operator terminal via the at least one server.

13. The system of claim 12, wherein the at least one robot has a width of 20 to 100 cm, height of 20 to 100 cm, length of 30 to 120 cm, and is adapted to operate on pedestrian paths, and travel with a speed of no more than 20 km/h.

14. The system of claim 12, wherein the operator terminal is constructed and adapted to control the robot in at least one of: (i) a potentially hazardous setting, and/or (ii) an unexpected setting.

15. The system of claim 12, wherein the at least one robot comprises a compartment constructed and adapted to store the delivery within the compartment, wherein the compartment is constructed and adapted to be opened to provide access to the delivery.

16. The system of claim 12, wherein the at least one robot is adapted for operation in an unstructured outdoors environment.

17. The system of claim 12, wherein the system further comprises at least one hub that is adapted to perform at least one of: storage, maintenance, repair, and/or resupply of the at least one robot and
wherein a particular hub comprises a communication module constructed and adapted to communicate with of other elements of the system.

18. The system of claim 12, wherein the operator terminal is adapted to control multiple robots.

19. The system of claim 12, wherein the at least one robot carrying the delivery weighs no more than 40 kg.

20. The system of claim 12, wherein the potentially hazardous setting also comprises: the at least one robot (i) operating along a road; and/or (ii) at a traffic light, and/or (iii) at a pedestrian crossing.

21. A method comprising:
providing instructions from at least one server to a particular robot of a plurality of robots about at least one delivery, said delivery comprising at least one delivery item, the instructions comprising information about a particular delivery location, wherein
the at least one server adapted for at least: coordinating communication, and for one or more of: receiving data, storing data, sending data, and performing computations; and
the plurality of robots navigate and operate at least semi-autonomously and communicate with the at least one server to facilitate transport of the delivery by the particular robot to at least one recipient;
the particular robot navigating autonomously to the particular delivery location, wherein the particular robot navigates and operates, at least in part, on paths intended for pedestrians, animals, wheelchairs, bicycles, and/or strollers; and then
the particular robot navigating autonomously to another location,
wherein:
during said navigating, while navigating and operating autonomously on a path intended for pedestrians, animals, wheelchairs, bicycles, and/or strollers, the particular robot determining that the particular robot is facing a potentially hazardous situation; and then,
in response to said determining, the particular robot notifying the at least one server of the potentially hazardous situation; and then,
in response to the receipt of data from the server indicating a hazardous setting, an operator terminal controlling the particular robot while dealing with the potentially hazardous situation, wherein the operator terminal communicates with and controls the particular robot through the at least one server; and then,
after the particular robot has dealt with the potentially hazardous situation, at least in part under control of the operator terminal, said particular robot resuming autonomous navigation and operation on said path intended for pedestrians, animals, wheelchairs, bicycles, and/or strollers, and
wherein the potentially hazardous situation comprises: the particular robot crossing a street, and/or the particular robot at a traffic light, and/or the particular robot at a pedestrian crossing,
wherein the server receives data transferred by the operator terminal and forwards the data to the robot and
wherein the robot acts based on the data sent by the operator terminal via the server and
wherein the operator terminal receives data about the robot via the server.

\* \* \* \* \*